United States Patent [19]

Brewer et al.

[11] Patent Number: 5,611,040

[45] Date of Patent: Mar. 11, 1997

[54] METHOD AND SYSTEM FOR ACTIVATING DOUBLE CLICK APPLICATIONS WITH A SINGLE CLICK

[75] Inventors: Timothy T. Brewer, Bellevue; Daniel S. Hoeger, Woodinville; Lora K. McCambridge, Bellevue; Teresa L. Kelsey, Seattle; Anthony R. Claflin, Bellevue; Kenneth R. Robertson, Redmond; Michael W. Van Flandern, Seattle, all of Wash.

[73] Assignee: Microsoft Corporation, Redmond, Wash.

[21] Appl. No.: 417,078

[22] Filed: Apr. 5, 1995

[51] Int. Cl.$^6$ .................................................. G06F 3/00
[52] U.S. Cl. ........................................ 395/326; 395/340
[58] Field of Search ................................. 395/155, 156, 395/157, 158, 159, 160, 161

[56] References Cited

U.S. PATENT DOCUMENTS

4,866,602  9/1989  Hall .
5,125,077  6/1992  Hall .

OTHER PUBLICATIONS

"Microsoft Ships Its First Broad Release of Windows Upgrade for a Test Run," Wall Street J. 3 star, Eastern Edition (21 Jun. 1994) p. B9.

*Computer Dictionary* (Second Edition, 1994), published by Microsoft Press, pp.: cover, copyright page, and 75 & 132.

Microsoft MOUSE User's Guide (Version 8.2, 1984–92), pp. i, ii, and 29–36.

Microsoft WINDOWS User's Guide (Version 3.1, 1990–92), pp.: i–xvii and 15.

*Primary Examiner*—Mark R. Powell
*Assistant Examiner*—A. Katbab
*Attorney, Agent, or Firm*—Ratner & Prestia

[57] ABSTRACT

A system and method for minimizing clicks in the operation of a graphical user interface such as the WINDOWS operating environment is disclosed. The invention emulates a double click (referred to as the "ClickSaver" feature) which virtually eliminates the need to double click thereby making Windows easier for both the novice and experienced Windows user. A ClickSaver process determines the type of window on which a single click has occurred and, if Click-Saver is enabled and the window has been deemed eligible for a double click such as an icon or control menu, the ClickSaver process sends a double click signal in order to activate the application.

16 Claims, 7 Drawing Sheets

METHOD AND SYSTEM FOR ACTIVATING DOUBLE CLICK APPLICATIONS WITH A SINGLE CLICK

FIELD OF THE INVENTION

This invention generally relates to actions requested using a graphical user interface and, more particularly, it relates to the interpretation of data signals based on a mouse pointer position relative to the graphical user interface.

BACKGROUND OF THE INVENTION

Many computer programs, including multimedia applications, use a graphical user interface such as the WINDOWS™ Operating System (version 3.1) by MICROSOFT Corporation ("WINDOWS"). Applications using graphical user interfaces, such as WINDOWS, provide a user with several ways of executing or carrying out commands such as restoring a window or launching an application.

Pop up menus are one type of tool by which a user can execute a command. In WINDOWS, a pop up menu may be associated with, for example, an icon representing a minimized application. In this case, the menu can be selected by performing a single "click" on the icon. It should be noted that the terms used throughout this application which have particular significance to a graphical user interface and the operation thereof such as "click" and "double click" are being used consistent with the definition provided in Computer Dictionary (2nd edition, 1994) published by MICROSOFT Press. The Computer Dictionary is herein incorporated by reference.

Once the pop up menu is presented (or displayed), a item in the menu can be selected with a another single click. Users familiar with WINDOWS know that, rather than wait for the menu to pop up, a double click can be used to accomplish the same result.

As mentioned, in WINDOWS, double clicking to achieve a desired result is well known as described in the Computer Dictionary as well as the explanation and use in the MICROSOFT MOUSE User's Guide (Version 8.2, 1984–92) which is also herein incorporated by reference. To accomplish a double click, however, the sequence of two back-to-back clicks must be accomplished within a preset time and range defined for double clicking. The method of setting the time and range for a double click, as well as other relevant information, is described in detail in the MICROSOFT WINDOWS User's Manual (Version 3.1, 1990–92) which is herein incorporated by reference.

Sometimes, however, having to double click to accomplish a result can be troublesome or inconvenient. Therefore, if a single click could be used for various instances where a double click is now required, user operation in the Windows environment could be further optimized.

Another instance where not having to click is a desirable goal is when, for example, as user desires to "drag and drop" an object into a window which currently is not under "focus". Focus is where a window is essentially placed in the foreground which, in a multitasking environment, refers to the process (program) that has control of the console and responds to commands issued from the mouse or keyboard.

For example, this may occur when several windows have been opened and are available in an overlap manner on the display, however, if an item is selected for "dragging and dropping" from the window under "focus" with its dropping destination in a window which is currently in the background, there is no convenient way to "focus" or bring the destination window to the foreground.

Working with the above described features may require basic use and knowledge of the WINDOWS software and its operation. Generally, a software program written for WINDOWS operation uses dynamic link libraries (DLLs) which contain a plurality of application programming interfaces (APIs). The APIs are used to carry out various WINDOWS functions. For example, if a software program requires a dialog box displayed on a computer monitor to prompt a user for a command or data entry, the software program would make a call to the DialogBox API which brings up a dialog box on the computer monitor. The contents of the dialog box are local to or associated with the particular application which made the call.

Another example of a WINDOWS API is the SetWindowLong API. This API associates data with a particular window, allowing a user who has switched applications to return to the point in the original application where processing had been taking place prior to the switch to the other application. WINDOWS operation and WINDOWS programming, including the use of DLLs and APIs are well known by those skilled in the art. The Microsoft WINDOWS Software Development Kit, Guide to Programming, Volumes 1–3, available on the Microsoft Developers Network, January 1995 is herein incorporated by reference. It is available and used by WINDOWS programmers and provides reference information for many of the DLLs and APIs which are available to WINDOWS programmers.

SUMMARY OF THE INVENTION

The presents invention involves a method and system for interpreting data received from a mouse to minimize the need for clicking in a graphical user interface. Initially, a process waits for a primary button click to occur on a window. Next, the process determines the type of window on which the primary click occurred. If the window is determined to be one of a plurality of predetermined types eligible for receiving a double click, a double click is emulated. However, if the window is not one of the plurality of predetermined types, then a double click is not emulated.

BRIEF DESCRIPTION OF THE DRAWINGS

The aspects, features and advantages of the present invention will be more readily understood from the following detailed description when read in conjunction with the accompanying drawings, in which.

DETAILED DESCRIPTION

CLICKSAVER

One aspect of the present invention which emulates a double click (also referred to as the "ClickSaver" feature) virtually eliminates the need to double click in, for example, the WINDOWS operating environment thereby making WINDOWS easier for both the novice and experienced WINDOWS user. Although the WINDOWS operating environment is a popular example of a graphical user interface, it will be appreciated by those skilled in the art that the ClickSaver feature of the present invention can be used with other types of graphical user interfaces which also require double clicking.

Figure 1:
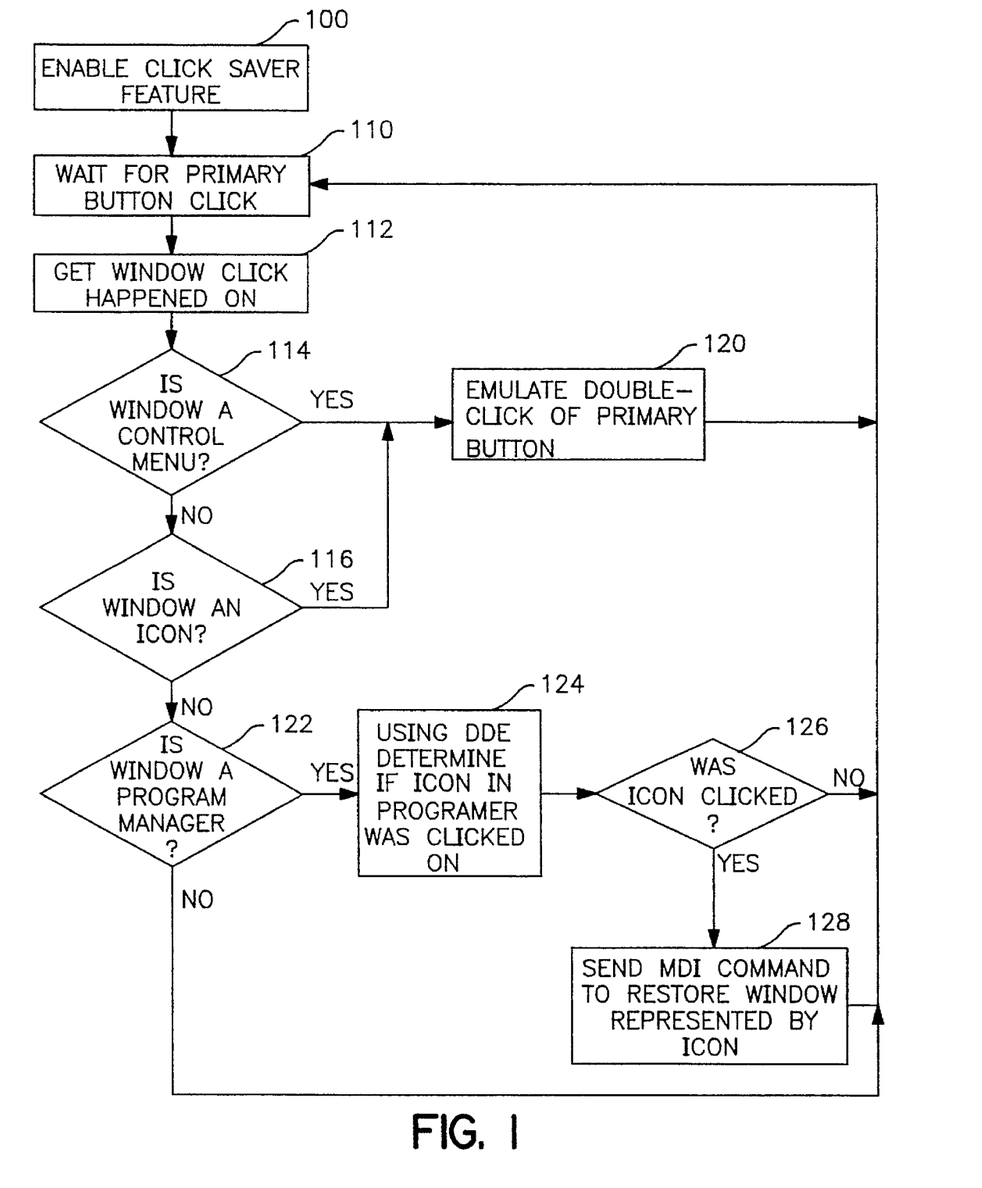
FIG. 1 is a high-level flow chart of the click saver aspect of the present invention.

FIG. 1 shows a high-level flow chart of an exemplary embodiment of the ClickSaver feature of the present invention. As shown in FIG. 1, first the ClickSaver feature is enabled at step 100. In the exemplary embodiment of the present invention, after the ClickSaver feature is enabled, if the control or shift keys are held down, ClickSaver is disabled and allows normal object selection activities to occur. Moreover, ClickSaver remains disabled until the operation is complete (i.e., a drag and drop occurs or a single file is clicked on to remove the multiple file selection).

Continuing with FIG. 1, the ClickSaver process, in step 110, waits for a primary button click or equivalent signal from a mouse. It should be noted that many currently available "mice" include two buttons which can be configured by way of mouse setup software as primary and secondary buttons for various applications. Additional detail on this point can be found in Windows 3.1 DDK Chapter 8 and Windows 3.1 Guide to Programming Chapter 20.

Next, at step 112, the ClickSaver process gets the window on which the single click occurred. Because the windows can be clicked on or selected using a pointing device such as a mouse, the windows must have a known location on the display screen so that the user can align the mouse pointer (also referred to a pointer or cursor) with the window. The window identification and location information is, of course, available to the ClickSaver process which uses it to interpret the input signals from the pointing device. In the exemplary embodiment, the window location and identification information is returned by a procedure call.

It should also be noted that, in the exemplary embodiment of the present invention, windows eligible for receiving an emulated double click signal, based on a single click when the ClickSaver feature is enabled, include that subset of windows or objects which would benefit from this feature such as system control menus, desktop icons, explorer icons, and application windows. For simplicity of description, this subset of windows are referred to generally as "control menus" or "icons".

Returning to FIG. 1, as shown in decision steps 114 and 116, if the window clicked on is a control menu or icon, a double click is emulated and sent to the object, step 120. The double click signal prompts the appropriate behavior to occur such as launching an application, restoring a window, closing an application, etc.

Figure 2:
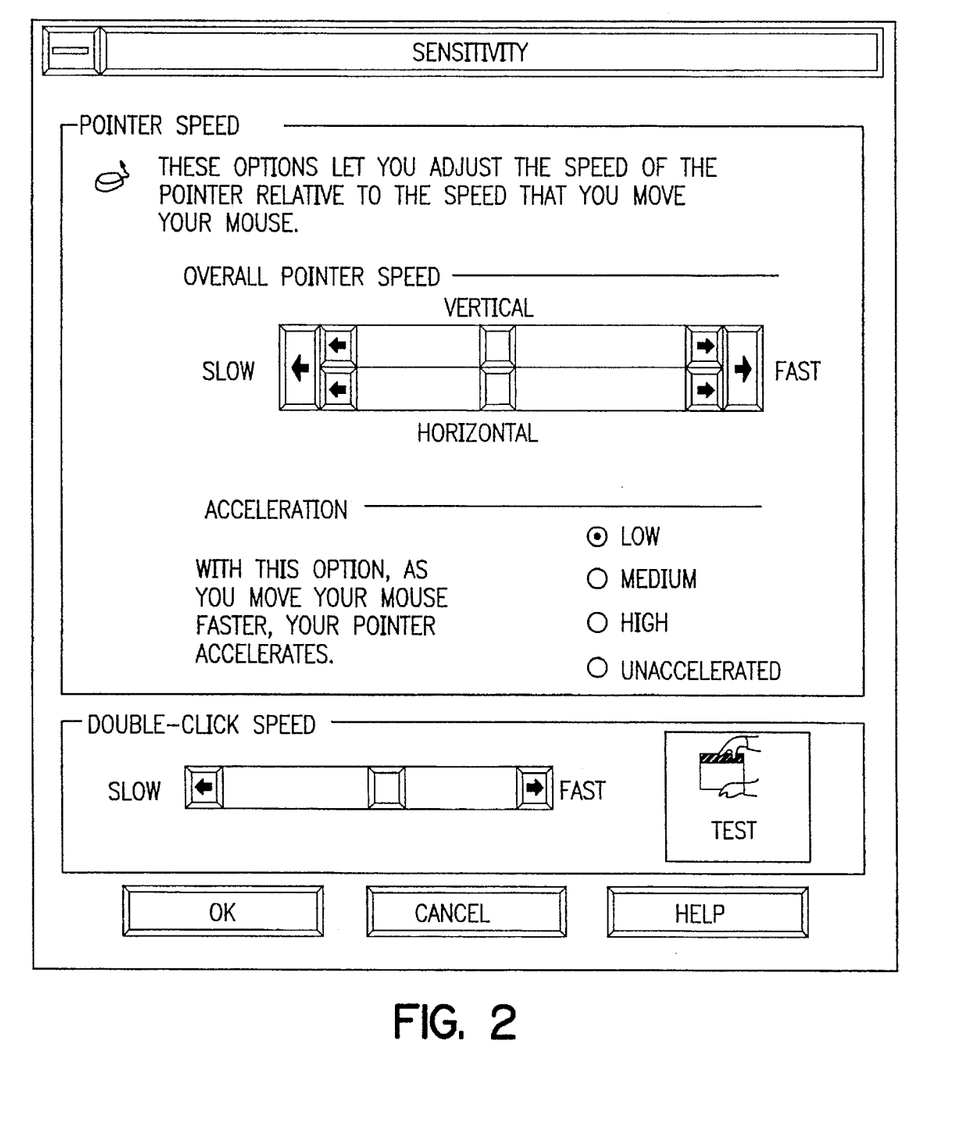
FIG. 2 is a flow chart providing additional detail regarding the operation of the click saver aspect of the present invention.

In the exemplary embodiment of the present invention, for the single click (i.e., button down then up) to be interpreted as a double click, the single click should occur within a preset double click time and range. As mentioned in the BACKGROUND, this time and range have default settings but can also be updated by a user via a mouse control window as shown in FIG. 2.

If, however, the button is held down longer than the double click time and range, then a single primary click is passed to the object. In this case, the object responds normally, for example, by popping up a system menu, by dropping down a system menu, etc. It should also be noted that, if the secondary mouse button is not redefined, a single primary click on the secondary mouse button is sent as a single primary click to pop up or drop down system menus.

If, at steps 114 and 116, the window clicked on is neither a control window nor an icon, at step 122, the process determines if the window is a program manager. If the object is not a program manager, the ClickSaver process returns to step 110 to wait for the next primary button click. If the window is a program manager, however, using dynamic data exchange (DDE) it is determined if an icon in the program manager window was clicked on as shown in step 124.

If, as shown in step 126, the window is an icon, then an MDI command is sent to restore the window represented by the icon, step 128. If not, the ClickSaver process returns to step 110 to wait for the next primary button click.

Figure 3A:
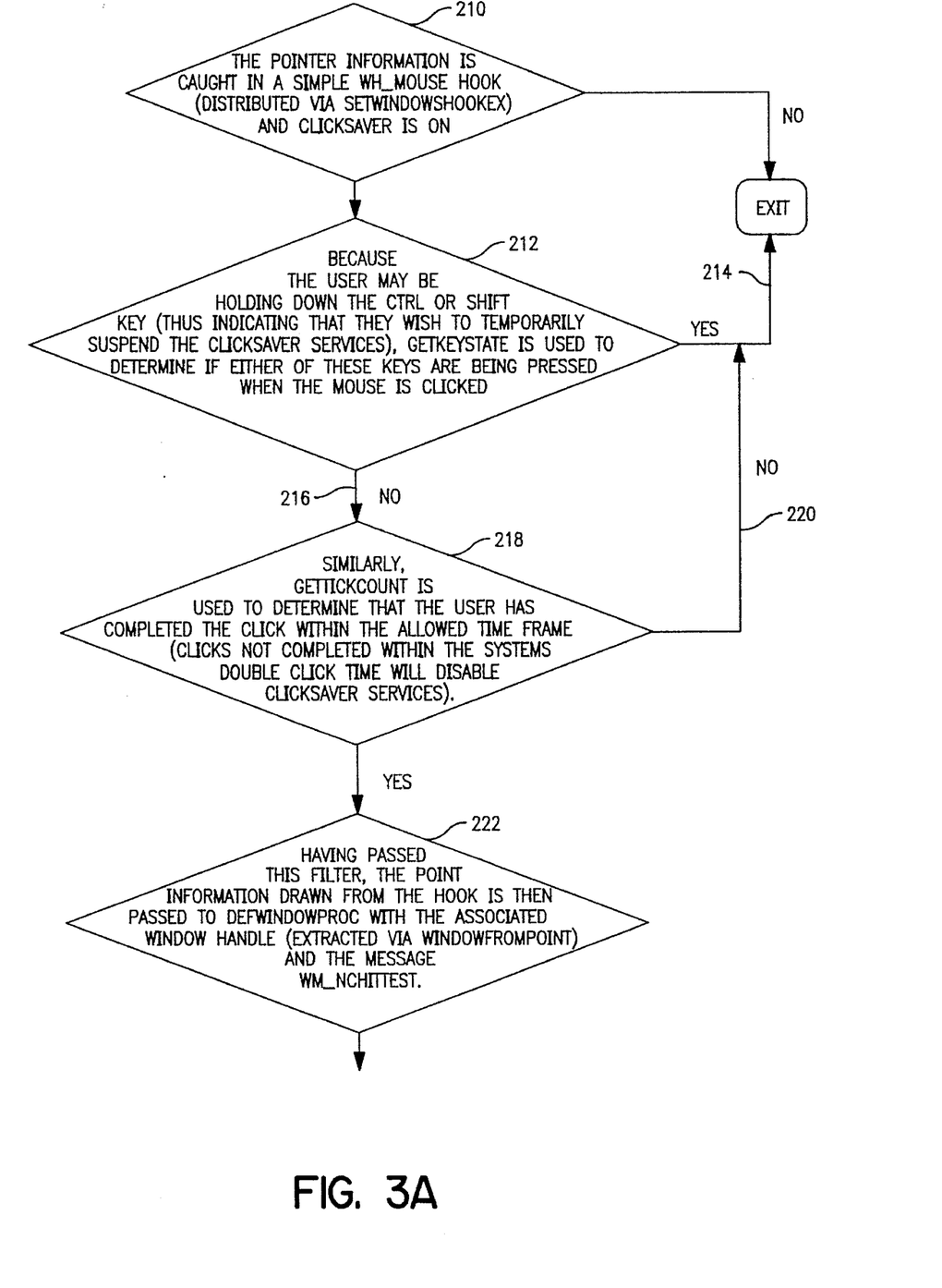
FIG. 3 is a flow chart providing additional detail regarding the operation of the click saver aspect of the present invention.
Figure 3B:
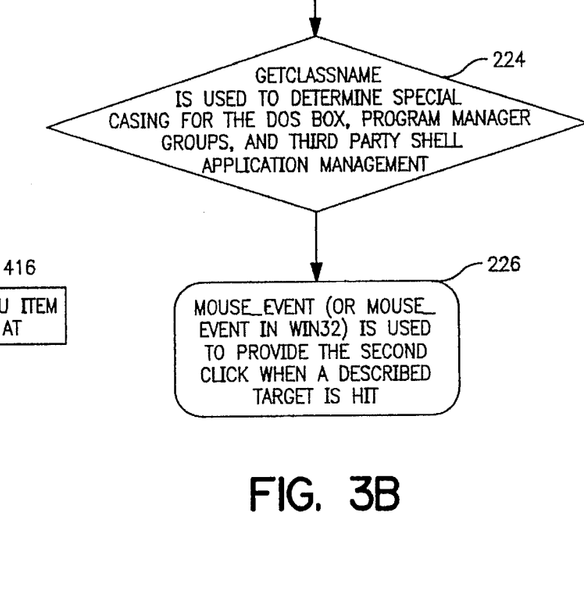

FIG. 3 is a flow chart which includes additional detail, including exemplary names for APIs used to retrieve and process information, for the ClickSaver process. In particular, at step 210, pointer information indicating that the user desires to enable the ClickSaver feature is retrieved by a programming hook, WH_MOUSE, and, consequently, the ClickSaver feature is enabled.

As mentioned above, the ClickSaver feature may be temporarily disabled by holding down the control or shift keys, thus, an API GetKeyState is used to determine if either of these keys is depressed, step 212, after a single primary click is received. If one of the designated keys is depressed, the ClickSaver process is exited, path 214; if neither of the keys is depressed, then the ClickSaver process continues, path 216.

Also mentioned, the ClickSaver feature, in the exemplary embodiment, is limited in time by the duration set for a double click. Thus, in step 218, an API GetTickCount is used to determine if the user completed the click (i.e., up and down activation of the mouse button) within the defined time frame. If the received primary click is within the double click time, the ClickSaver process continues, otherwise the process exits, path 220.

Once the click is determined to have happened without a control or shift key depressed and within the double click time, the window on which the click occurred is identified. At step 222, the mouse pointer location (i.e., coordinates of the mouse pointer) are passed to a procedure, DefWindowProc, with an associated window handle and the message WM_NCHITTEST. Once executed, the procedure DefWindowProc returns a value which identifies the type of window on which the click occurred.

In the exemplary embodiment, at step 224, an additional API, GetClassName, is used to handle special cases such as when a DOS box, a Program Manager Group or third party shell application management are the windows clicked on. A timer of one second is used to filter out any additional clicks. This was done to deter any triple click conditions.

Finally, at step 226, if all filters have been passed, the Mouse_Event API provides a second click, thereby emulating a double click, when a desired target is hit.

FOCUS

Another aspect of the present invention, referred to as the "Focus" feature, also eliminates a need to click under certain circumstances but for a different purpose, in particular, the Focus feature eliminates the need to single click on predetermined windows and applications in order to establish a "focus". That is to say, as a user moves the mouse pointer around the screen in WINDOWS, the Focus feature essentially follows the pointer and the equivalent of a single click is sent to windows such as icons or system menus in the desktop environment, to windows such as file manager and program manager in Version 3.1 in the explorer window or to system menus when the pointer passes over them.

For example, if several windows have been opened, the window under "focus" is the window in the foreground of the display. The other windows, not under "focus", are represented in an overlapped manner with at least a portion of each background window exposed. Prior to implementation of this feature, a user would have to click on a background window to bring the window to the foreground. With the Focus feature enabled, the user simply has to place the cursor on the exposed portion of a background window to change the focus to that window and place it in the foreground.

Figure 4:
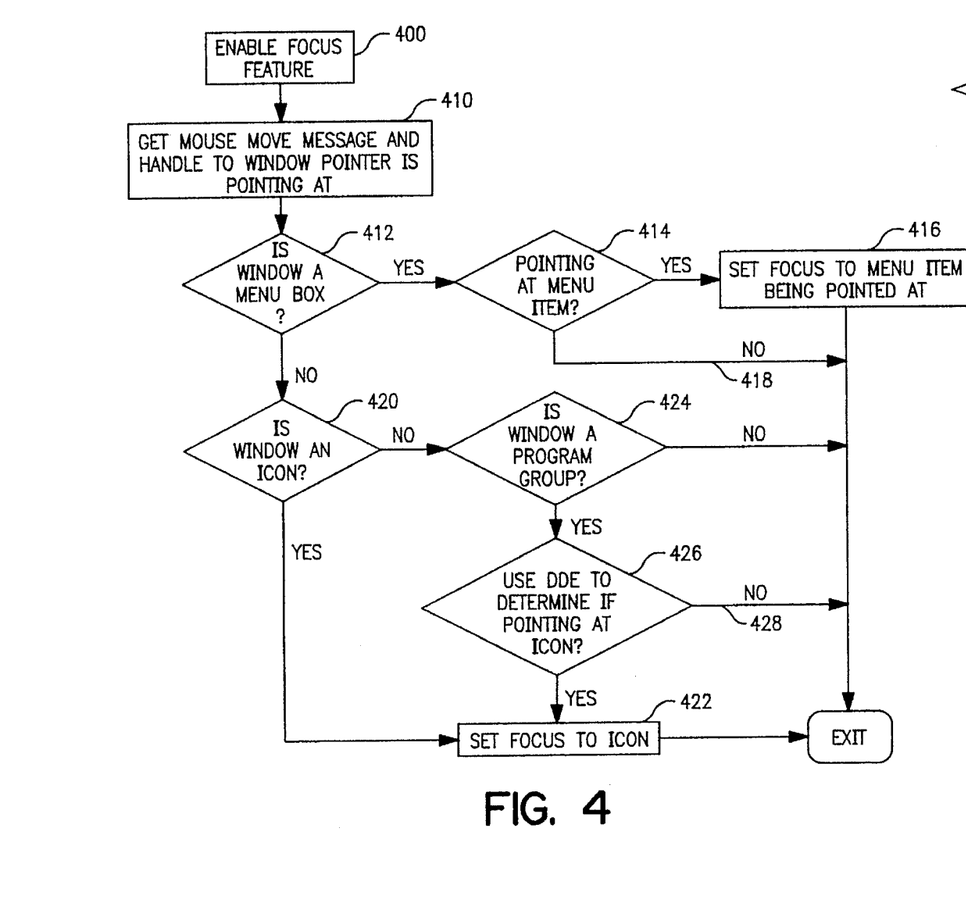
FIG. 4 is high-level flow chart illustrating the focus aspect of the present invention.

FIG. 4 is high-level flow chart illustrating the Focus aspect of the present invention. As shown, first, at step 400, the Focus feature is enabled. Next, at step 410, the pointer position is periodically monitored and when the pointer position changes (i.e., the mouse is moved), it is determined at what the mouse is pointing.

If, at step 412, the pointer is pointing at a menu box, the Focus process next determines, at step 414, if the pointer is pointing at a menu item within the menu box. If a menu item is being pointed at, the focus is set to the menu item, step 416; otherwise, the Focus process exits, path 418.

If, however, at step 412, the pointer is not pointing at a menu box, the Focus process checks whether the pointer is pointing at an icon, step 420. If an icon is being pointed at, the focus is set on the icon, step 422. If, however, at step 420, the Focus process determines that the pointer is not pointing at an icon, then, at step 424, it determines if a program group is being pointed at. If it is not, then the Focus process exits; if it is, then the Focus process continues to step 426 where it uses DDE to determine if, within the program group, the mouse is pointing at an icon. As shown, if it is an icon, the focus is set to the icon at step 422, otherwise, the Focus process exits, path 428.

Figure 5:
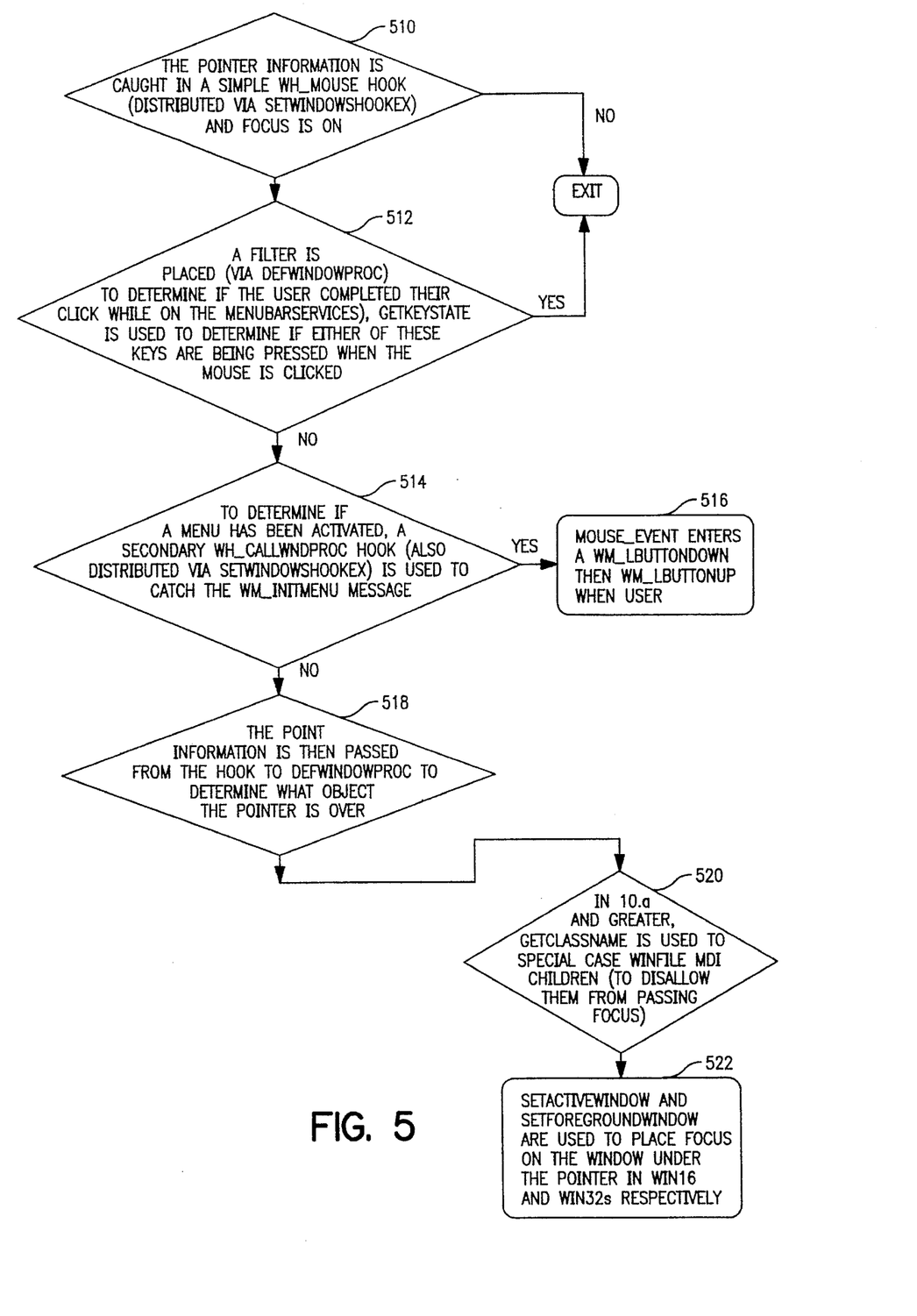
FIG. 5 is flow chart providing additional detail regarding the operation of the focus aspect of the present invention.

As FIG. 3 provides additional details for the high-level flowchart of FIG. 1, FIG. 5 shows additional details, including exemplary names for APIs used to retrieve and process information, for the Focus process shown in FIG. 4.

As shown in FIG. 5, at step 510, pointer information indicating that the user desires to enable the Focus feature is retrieved by a programming hook, WH_MOUSE, and, consequently, the Focus feature is enabled. Step 512 indicates that a filter is placed, by way of DefWindowProc, to determine if the user completed a click while on a menubarservices. The GetKeyState API is used to determine if either of these keys are depressed when the mouse is clicked. If they are, the Focus process exits; otherwise, the Focus process continues to step 514.

At step 514, it is determined if a menu has been activated. In the exemplary embodiment of the present invention, this is accomplished via a secondary hook, WH_CALLWND-PROC, such that the WM_INITMENU message is detected. If a menu has been activated, at step 516, Mouse_Event sends a button down/button up sequence to emulate a single click. If a menu has not been activated, the Focus process continues to step 518.

At step 518, the pointer information is passed to DefWindowProc in order to determine at which window the pointer is currently pointing. In the exemplary embodiment, the value returned by DefWindowProc indicates the type of window at which the pointer is pointing.

Next, at step 520, a special case filter is performed to disallow Winfile MDI children from getting the focus. In particular, the GetClassName API is used to determine if the object is a Winfile MDI child. This was done to deter errors caused when Focus passed between these windows. The class name of WinFile MDI window is "WFS_Tree".

Finally, at step 522, the appropriate API is used to place focus on the window under the pointer. In the exemplary embodiment of the present invention, the appropriate API for Win16 is SetActiveWindow, and for Win32, the appropriate API is SetForegroundWindow.

A particularly useful application for the Focus feature is what is known in the art as a "drag and drop". As described in the BACKGROUND, an instance where not having to click is useful is when a user desires to "drag and drop" an object into a window which is currently not in the foreground. This can occur, for example, when several windows have been opened and are available in an overlap manner on the display. However, if an object is selected for "dragging and dropping" from the window under "focus" with its dropping destination in a window currently in the background, in the past, there has been no convenient way to "focus" or bring the destination window to the foreground. With the Focus feature activated, however, a user is able to drag and drop objects onto targets where only a small portion of the target is visible.

That is, as a user moves the pointer around the screen in WINDOWS, the focus follows the pointer so whatever a user is pointing at can be easily recognized. When dragging and dropping, the user need only stop moving when positioned over the target on which the drop is desired (whether the actual target group, file, service, etc. is visible) and focus shifts to that window and allows the operation to complete.

Figure 6:
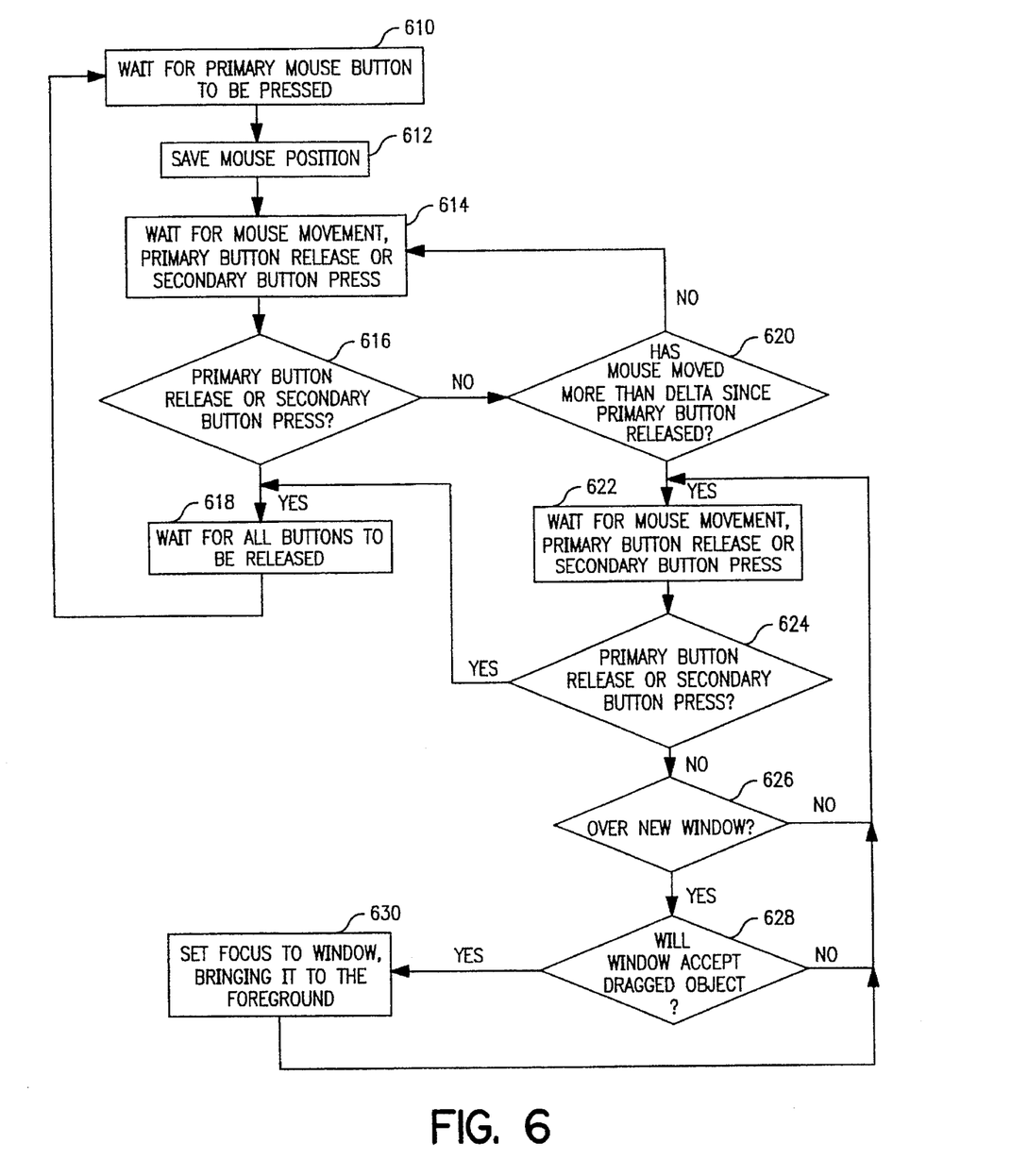
FIG. 6 is a high-level flow chart illustrating the drag-and-drop focus aspect of the invention.

FIG. 6 is a high-level flow chart illustrating the drag-and-drop application of the Focus aspect of the present invention.

As seen in FIG. 6, first, the process waits for a primary button to be depressed, step 610. At step 612, the position of the pointer is saved at the point where the button depression occurred. At step 614, the process waits for either mouse movement, primary button release or secondary button depression. If, before mouse movement occurs, the primary button is released or the secondary button is depressed, step 616, the process waits for all buttons to be released, step 618, and returns to step 610.

Step 620 checks to see if the mouse has moved more than a predetermined amount, designated as DELTA. If the mouse has not moved more than DELTA, the process loops back to step 614. If the mouse has moved a distance greater than DELTA, the process moves forward to steps 622 and 624 which essentially parallel the functionality of steps 614 and 616 of waiting for some activity (e.g., mouse movement or button activity).

If, eventually, mouse movement occurs over a new window, step 626, then, at step 628, it is determined whether the new window can accept the object being dragged. If the new window cannot accept the object, the process loops back to step 622. If, on the other hand, the new window can accept the object, the process continues to step 630 where the focus is set to the new window, consequently, bringing that window to the foreground. At this point, the user has the option to complete the drag and drop by dropping the object being dragged into the new foreground window or continuing the drag to another new window.

Figure 7:
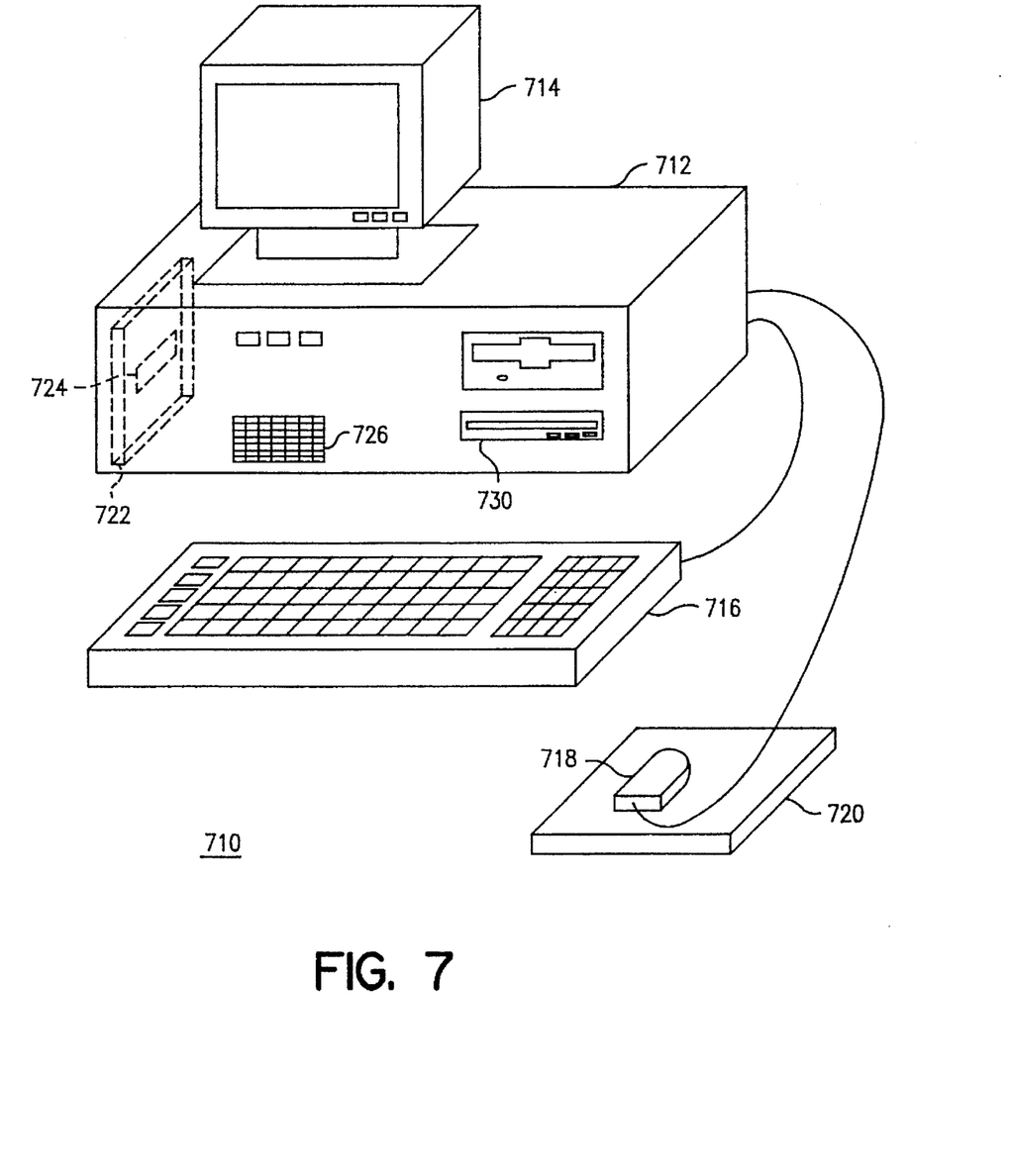
FIG. 7 shows a personal computer on which an exemplary embodiment of the present invention can be executed.

FIG. 7 shows an exemplary computer system 710 suitable for use with the present invention. In the exemplary embodiment of the present invention, the necessary WINDOWS software could be executed and displayed on computer system 710. In particular, computer system 710 includes of a personal computer 712 having several peripheral devices including monitor 714, keyboard 716, mouse 718 (resting on mouse pad 720), sound card 722 (including a CODEC 724) plugged inside of computer 712 and a speaker 726. Computer system 710 also includes a CD-ROM drive 730 for retrieving information stored on CD-ROM. As understood by those skilled in the art, the present invention is not limited to the configuration for computer system 710 shown in FIG. 1. Other configurations which can operate the present method and system will be understood by those skilled in the art.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A computer-implemented method for interpreting data received from a mouse to minimize the need for clicking the mouse when using a graphical user interface which includes a plurality of window types, the plurality of window types includes a subset of windows designed to be activated only by a double click, the method comprising the steps of:

receiving a single click;

determining if the single click occurred on the subset window type;

sending a double click signal, if the window is the subset window type, to activate the window.

2. The method of claim 1, further comprising the steps of determining if the received click occurred within a time period less than a predetermined time period defined for double clicking; and not sending a double click signal, if the received click did not occur within the predetermined time.

3. The method of claim 1, further comprising the step of determining if a control key or a shift key are depressed concurrently with the click; and not sending a double click signal, if a control key or a shift key was depressed concurrently with the click.

4. The method of claim 1, wherein the graphical user interface is provided by a WINDOWS operating environment.

5. A system for interpreting data received from a mouse to minimize the need for clicking the mouse when using a graphical user interface which includes a plurality of window types, the plurality of window types includes a subset of windows designed to be activated only by a double click, the system comprising:

means for receiving a single click;

means for determining if the single click occurred on the subset window type;

means for sending a double click signal, if the window is the subset window type, to activate the window.

6. The system of claim 5, further comprising means for determining if the received click occurred within a time period less than a predetermined time period defined for double clicking and for not sending a double click signal, if the received click did not occur within the predetermined time.

7. The system of claim 5, further comprising means for determining if a control key or a shift key are depressed concurrently with the click and for not sending a double click signal, if a control key or a shift key was depressed concurrently with the click.

8. The system of any one of claims 5 to 7, wherein the graphical user interface is provided by a WINDOWS operating environment.

9. The system of claim 5, wherein the subset window type includes control menus and icons.

10. A computer-implemented method to minimize the need for clicking when using a graphical user interface, related to an operating system, which includes a plurality of window types, the plurality of window types includes a subset of windows designed to be activated only by a double click, the method comprising the steps of:

enabling a click saver feature;

receiving a single click;

identifying, by way of a request to the operating system, if the type of window on which the single click occurred is the subset window type;

if the single click occurred on the subset window type, sending a double click signal in order to activate the window.

11. The method of claim 10, further comprising the steps of determining if the received click occurred within a time period less than a predetermined time period defined for double clicking; and not sending a double click signal, if the received click did not occur within the predetermined time.

12. The method of claim 10, further comprising the step of determining if a control key or a shift key are depressed concurrently with the click; and not sending a double click signal, if a control key or a shift key was depressed concurrently with the click.

13. A computer-implemented system to minimize the need for clicking when using a graphical user interface, related to an operating system, which includes a plurality of window types, the plurality of window types includes a subset of windows designed to be activated only by a double click, the system comprising:

means for enabling a click saver feature;

means for receiving a single click;

means for identifying, by way of a request to the operating system, if the type of window on which the single click occurred is the subset window type;

means for sending, if the single click occurred on the subset window type, a double click signal in order to activate the window.

14. The system of claim 13, further comprising means for determining if the received click occurred within a time period less than a predetermined time period defined for double clicking and for not sending a double click signal, if the received click did not occur within the predetermined time.

15. The system of claim 13, further comprising means for determining if a control key or a shift key are depressed concurrently with the click and for not sending a double click signal, if a control key or a shift key was depressed concurrently with the click.

16. The system of claim 13, wherein the subset window type includes control menus and icons.

* * * * *

UNITED STATES PATENT AND TRADE MARK OFFICE
CERTIFICATE OF CORRECTION

PATENT NO. : 5,611,040
DATED : March 11, 1997
INVENTOR(S) : Brewer et al.

It is certified that error appears in the above-identified patent and that said Letters Patent is hereby corrected as shown below:

On the cover page, item [56] References Cited, add the following references:

U.S. PATENT DOCUMENTS 5,437,014   7/1995   Busboom et al.
5,502,459   3/1996   Marshal et al.

OTHER PUBLICATIONS

Microsoft Office, Getting Started, MS Corp., 1992-93, pages 1 and 10.

Signed and Sealed this

Twenty-third Day of September, 1997

Attest:

BRUCE LEHMAN

Attesting Officer   Commissioner of Patents and Trademarks